United States Patent [19]

Yasuda et al.

[11] Patent Number: 4,658,309
[45] Date of Patent: Apr. 14, 1987

[54] TRACKING CONTROLLING APPARATUS

[75] Inventors: Yukihiro Yasuda, Kanagawa; Hiroshi Yoshioka, Chiba; Takao Takahashi, Kanagawa, all of Japan

[73] Assignee: Sony Corporation, Tokyo, Japan

[21] Appl. No.: 476,808

[22] Filed: Mar. 18, 1983

[30] Foreign Application Priority Data

Mar. 18, 1982 [JP] Japan .................................. 57-41638
Mar. 18, 1982 [JP] Japan .................................. 57-41640

[51] Int. Cl.$^4$ ............................................. G11B 5/56
[52] U.S. Cl. .................................................... 360/77
[58] Field of Search ............................. 360/70, 75, 77

[56] References Cited

U.S. PATENT DOCUMENTS

4,247,741  1/1981  Tatsuguchi et al. ................. 369/43
4,497,000  1/1985  Terada et al. ......................... 360/70

Primary Examiner—George G. Stellar
Attorney, Agent, or Firm—Lewis H. Eslinger; Alvin Sinderbrand

[57] ABSTRACT

In an apparatus for controlling the tracking position of a magnetic head which reproduces parallel tracks successively formed on magnetic tape, the parallel tracks containing a video signal and a pilot signal having mutually different frequencies changing in cyclic sequence from track to track, a pair of control signals are generated in response to amplitudes of the reproduced pilot signal, said pair of control signals being indicative of opposite displacements of the head from the track to be traced, and a tracking error signal is formed by mixture of the pair of control circuits to control the tracking position in response to said tracking error signal. In accordance with this invention, magnitude of the pair of control signals is independently controlled according to the desired tracking position of the head.

12 Claims, 61 Drawing Figures

TRACKING CONTROLLING APPARATUS

BACKGROUND OF THE INVENTION

This invention relates to a tracking controlling apparatus, and more particularly to a tracking controlling apparatus of an automatic tracking following system (ATF system) wherein pilot signals recorded on information recording tracks formed on a record medium are reproduced by a reproducing head in order to cause the reproducing head to track reproducing tracks in accordance with such pilot signals thus detected.

Conventionally, an ATF system such as disclosed in U.S. Pat. No. 4,297,733 is known as a system for achieving phase-servoing of a capstan system of a video tape recorder (VTR). In this system, relative phase positions between a reproducing head and pilot signals continuously or intermittently recorded on information recording tracks of a tape as a record medium are detected to correct errors therebetween in order to control the speed of a capstan motor and hence the speed of travel of the tape. According to the system, while it is relatively easy to attain accurate tracking lock of a reproducing head to individual tracks, it is difficult to attain tracking lock to a position on the tape which is displaced from individual tracks.

Conventionally in VTRs, however, it is sometimes desired to lock a reproducing head to a position displaced from individual tracks if necessary such as when a reproducing head is to be set to a desired track for after recording or when crosstalk is to be measured relative to the magnitude of tracking displacement in order to effect adjustment of a VTR. From this point of view, apparatus of the system are not satisfactory in function.

As a second system which can solve this problem, a control signal system (CTL system) is known. In this system, timing pulse signals which are recorded in prior as control signals on a tape along a direction of travel of the tape are reproduced by means of a specific control signal reproducing head and a capstan motor is controlled in accordance with a result of comparison between the phase of control signals thus reproduced and the phase of reference pulses which are produced independently. In the system, the phase of reference pulses can be delayed by means of a controllable element such as, for example, an element which is called a tracking control volume. Thus, tracking lock points can be easily displaced in this system. According to the CTL system, however, a tape must be provided with a specific track on which control signals are recorded, and besides, a fixed head for reproducing such control signals from the specific track must be provided in addition to recording and reproducing heads for video signals; thus, the system is disadvantageous in that constructions associated with a tape must be complicated when compared with the ATF system.

OBJECTS AND SUMMARY OF THE INVENTION

In consideration of these circumstances, the present invention provides a tracking controlling apparatus of the ATF system wherein a tracking lock point can be easily displaced.

In accord with the present invention, an apparatus for controlling the tracking position of a head which records and reproduces a track sequentially on a record medium, each track containing a pilot signal recorded therein having a different frequency from adjacent tracks, the frequencies changing in cyclic sequence from track to track, includes control signal generating means for generating first and second control signals which are respectively indicative of opposite displacements of the head from a track to be traced, tracking error signal generating means for generating a tracking error signal from the first and second control signals, the tracking position being controlled in response to the tracking error signal, and control means for controlling the magnitude of the tracking error signal according to a desired tracking position of the head.

The present invention will be described with reference to a preferred embodiment thereof taken in conjunction with accompanying drawings.

FIGS. 8A through 9C are diagrammatic representations for illustrating operations of first and second error signal forming circuits of FIG. 7, respectively;

DESCRIPTION OF THE PREFERRED EMBODIMENTS

Figure 1:
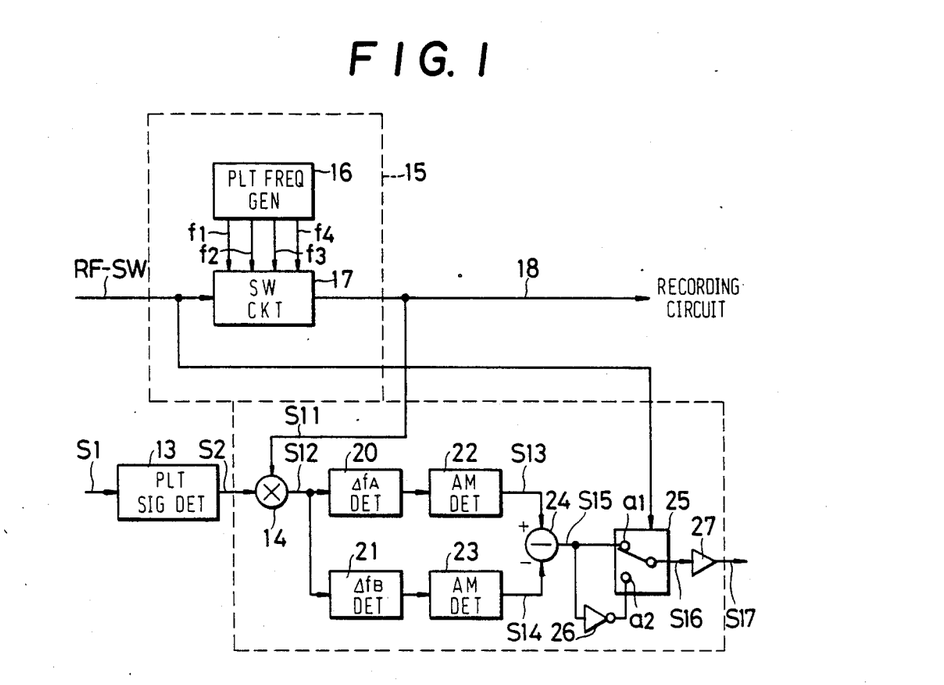
FIG. 1 is a block diagram showing a basic construction of a tracking controller apparatus to which the present invention can be applied.
Figure 2:
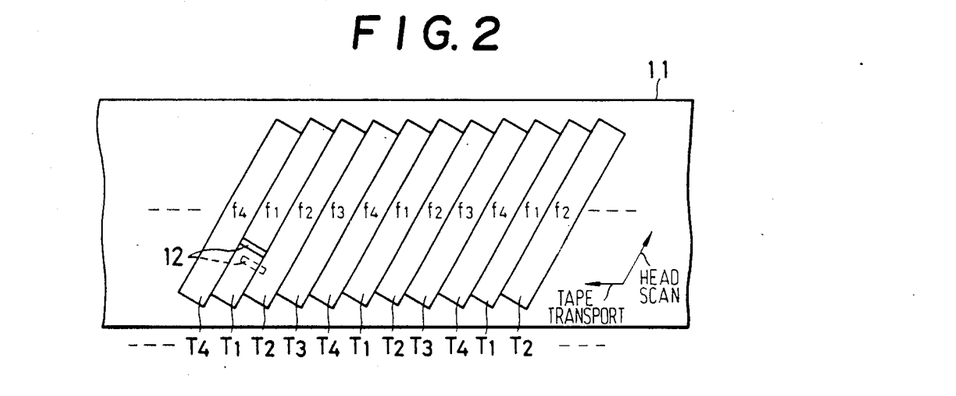
FIG. 2 is a diagrammatic representation of a track pattern on a tape.

FIG. 1 illustrates a basic construction of an apparatus which effects desired tracking control in response to pilot signals reproduced from information recording tracks of a tape on which they are recorded sequentially. As shown in FIG. 2, a tape 11 has sequentially repetitively formed thereon a set of a plurality of, for example, 4, video tracks T1, T2, T3 and T4 which have four kinds of pilot signals f1, f2, f3 and f4 different frequencies recorded thereon, respectively, the video tracks extending obliquely in mutually close relationship on the tape 11. In the embodiment, the effective width of a video head which acts as a reproducing head 12 is selected, for example, substantially equal to the width of each of the tracks T1 to T4. As a result, when the reproducing head 12 properly tracks a track which is being currently scanned for reproduction (the track will be hereinafter called a reproduced track), only pilot signals recorded on the track will be reproduced and consequently, a reproduction output will include only a single pilot frequency component therein. On the contrary, if the reproducing head 12 is displaced rightwardly or leftwardly relative to the track, then pilot signals recorded on another adjacent track on the right or left side of the reproduced track will be reproduced additionally and accordingly, a reproduction output will include two pilot frequency components therein.

Frequencies f1 to f4 of the four pilot signals f1 to f4 are selected to be within a band further below color components which are converted into low frequencies (600 to 700 [kHZ]). The difference in frequency of pilot signals recorded on each of the odd-numbered tracks T1 and T3 of the cycling four tracks T1 to T4 from pilot signals on another adjacent track on the right-hand side of the track is selected to be $\Delta fA$ while the difference in frequency of pilot signals on each odd-numbered track T1, T3 from pilot signals on another adjacent track on the left-hand side of the track is selected to be $\Delta fB$. Thus, the difference in frequency of pilot signals on each even-numbered track T2, T4 from pilot signals on another adjacent track on the right-hand side is $\Delta fB$ while the difference in frequency of the same from pilot signals on the left-hand side is $\Delta fA$.

Accordingly, if signals the frequency of which are $\Delta fA$ are included as a frequency component of pilot signals in reproduced signals when the head 12 is reproducing an odd-numbered track T1, T3, then it proves that the head 12 is in a rightwardly displaced position; on the contrary, if signals the frequency of which is $\Delta fB$ are included, then the head 12 is in a leftwardly displaced position; and if no signals the frequency of which is $\Delta fA$ or $\Delta fB$ are included, it is apparent that proper tracking is maintained.

Similarly, if signals the frequency of which is $\Delta fB$ are included as a frequency component of pilot signals in reproduced signals when the head 12 is reproducing an even-numbered track T2, T4, then it proves that the head 12 is in a rightwardly displaced position; on the contrary, if signals the frequency of which is $\Delta fA$ are included, then the head 12 is in a leftwardly displaced position.

In the present embodiment, frequencies f1, f2, f3 and f4 assigned to the first, second, third and fourth tracks T1, T2, T3 and T4, respectively, are selected to be f1=102 [kHZ]; f2=116 [kHZ]; f3=160 [kHZ]; and f4=146 [kHZ], and hence the differences in frequency $\Delta fA$ and $\Delta fB$ are:

$$\Delta fA = |f1 - f2| = |f3 - f4| = 14 \text{ [kHZ]} \quad (1)$$

$$\Delta fB = |f2 - f3| = |f1 - f4| = 44 \text{ [kHZ]} \quad (2)$$

Reproduction signals S1 obtained from the head 12 and having such contents are applied to a pilot signal detecting circuit 13 constructed as a low pass filter at which pilot signals f1 to f4 are extracted as detected pilot signals S2 from the reproduction signals S1. The detected pilot signals S2 are fed to a multiplier 14 as a first multiplication input. Reference pilot signals S11 are fed from a tracking signal generator 15 as a second multiplication input to the multiplier 14.

Figure 3A:
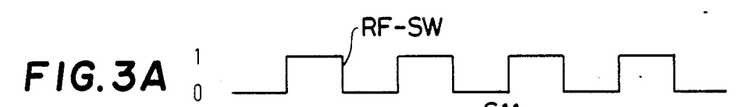
FIGS. 3A–3H are signal waveform charts for illustrating operations of the apparatus of FIG. 1.
Figure 3B:
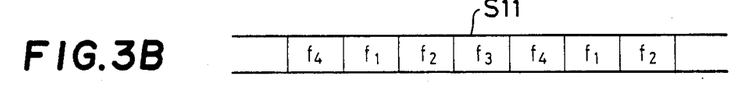
Figure 3C:
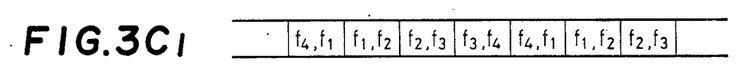
Figure 3C:
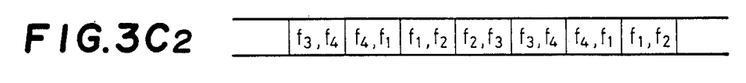
Figure 3D:
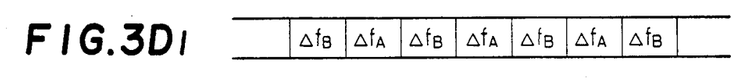
Figures 3D, 3E:
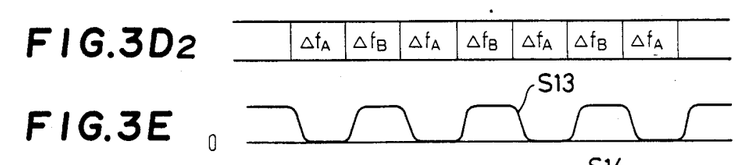
Figure 3F:
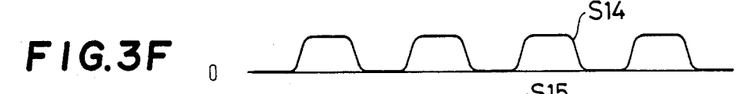
Figure 3G:
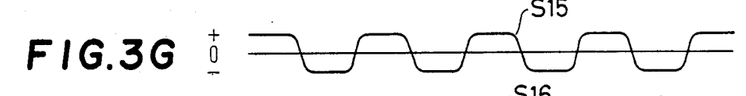
Figure 3H:
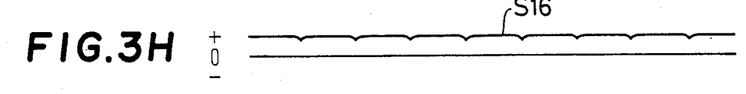

The tracking signal generator 15 includes a pilot frequency generating circuit 16 for generating four different pilot frequency outputs f1 to f4 of the frequencies f1 to f4, respectively, and a switching circuit 17 which receives head change-over pulses RF-SW (A of FIG. 3) whose logic level is changed each time two video heads associated with a rotary drum (not shown) are alternately rendered operative for scanning of a tape. It is to be understood that the switching circuit 17 of the present embodiment includes a quaternary counter circuit which counts each time the level of the head change-over pulses changes. Thus, gate signals corresponding to the first to fourth tracks T1 to T4 are sequentially repetitively provided from the counter circuit. Gates are switched open by the gate signals for the tracks T1 to T4 so that the pilot frequency outputs f1 to f4 of the pilot frequency generating circuit 16 as shown by B of FIG. 3 are sequentially delivered as reference pilot siginals S11.

It is to be noted that pilot frequency outputs f1 to f4 obtained at output terminals of the switching circuit 17 are delivered as pilot signals to a video head over a signal line 18. While the video head scans the first to fourth tracks T1 to T4, pilot signals of corresponding frequencies f1 to f4 are sequentially fed to the video head to record the pilot signals onto individual tracks T1 to T4.

Thus, if detected pilot signals S2 obtained at output terminals of the pilot signal detecting circuit 13 while the video head 12 is scanning the first to fourth tracks T1 to T4, respectively, are multiplied by a reference pilot signal S11 generated in synchronism with the currently reproduced track, then a multiplication output S12 is obtained thereby which includes a component of frequency having a frequency corresponding to a difference between a frequency component included in the detected pilot signals S2 and a frequency of the reference pilot signals S11 where there is a tracking error (in fact, a multiplication output S12 includes other signal components such as a frequency component of sum). The multiplication output S12 is coupled to first and second difference frequency detecting circuits 20 and 21, respectively. When a signal component of the frequency difference $\Delta fA$ depending upon the equation (1) hereinabove is included in the multiplication output S12, it is extracted by the first difference frequency detecting circuit 20 and is then converted into a direct current by means of an amplitude detector circuit 22 constructed as a rectifier circuit to obtain a first error detection signal S13 of a direct current level. Similarly, when a signal component of the frequency difference $\Delta fB$ depending upon the equation (2) hereinabove is included in the multiplication output S12, it is extracted by the second difference frequency detecting circuit 21 and is then converted into a direct current by means of another amplitude detector circuit 23 to obtain a second error detection signal S14.

Thus, if the head 12 is displaced rightwardly while it scans the first, second, third and fourth tracks T1, T2, T3 and T4, the detected pilot signal S2 obtained from the reproduction output S1 of the head 12 will include therein pilot signals of the frequencies f1 and f2, f2 and f3, f3 and f4, and f4 and f1, respectively, as shown by C1 of FIG. 3. Accordingly, a signal will be produced as the multiplication output S12 which sequentially includes therein corresponding difference frequencies $\Delta fA(=f1 \sim f2)$, $\Delta fB(=f2 \sim f3)$, $\Delta fA(=f3 \sim f4)$, and $\Delta fB(=f4 \sim f1)$ as shown by D1 of FIG. 3. On the contrary, if the head 12 is in a leftwardly displaced position, the detected pilot signal S2 will sequentially include therein pilot signals of the frequencies f4 and f1, f1 and f2, f2 and f3, and f3 and f4, as shown by C2 of FIG. 3. Accordingly, the multiplication output S12 will sequentially include therein the difference frequencies $\Delta fB(=f4\sim f1)$, $\Delta fA(=f1\sim f2)$, $\Delta fB(=f2\sim f3)$, and $\Delta fA(=f3\sim f4)$, respectively, as shown by D2 of FIG. 3.

Thus, first and second error detection signals S13 and S14 having a direct current level which rises from 0 each time the track scanned by the head 12 is changed over, as shown by E and F of FIG. 3 (which shows, for example, a rightwardly displaced condition), can be obtained from the amplitude detector circuits 22 and 23, respectively.

The first and second error detection signals S13 and S14 are fed as an adding input and a subtracting input, respectively, to a subtracting circuit 24 which thereby provides a subtraction output S15 that varies alternatingly each time the first and second error detection signals S13 and S14 are produced alternately, as shown by G of FIG. 3. The subtraction output S15 is fed directly to a first input terminal a1 of a change-over switch circuit 25 while it is inverted in polarity at an inverter circuit 26 and is then fed to a second input terminal a2 of the change-over switch circuit 25. The change-over switch circuit 25 switches, in response to a head change-over pulse RF-SW applied thereto, to the first input terminal a1 when, for example, the head 12 scans an odd-numbered track T1 or T3; on the contrary, when the head 12 scans an even-numbered track T2 or T4, it switches to the second input terminal a2 thereof. Thus, when the head 12 is in a rightwardly displaced position, a positive DC level output S16 as shown by H of FIG. 3 will be obtained. (On the contrary, when the head 12 is in a leftwardly displaced position, its DC level output S16 is in negative polarity.) This output is fed out as an error signal S17 by way of a DC amplifier 27. If the head 12 is displaced, for example, rightwardly, then a signal component of the frequency difference $\Delta fA$ will appear at the output terminal of the multiplier circuit 14 when the reproduced track is of an odd number T1 or T3 and hence an output of the first difference frequency detecting circuit 20 will be fed to the subtracting circuit 24 which thereupon will produce an error signal S17 of a positive DC level since the change-over switch circuit 25 is switched to the first input terminal a1 thereof; on the contrary, when the reproduced track is of an even number T2 or T4, a signal component of the frequency difference $\Delta fB$ will appear at the output terminal of the multiplier circuit 14 and hence an output from the second difference frequency detecting circuit 21 will be coupled to the subtracting circuit 24 which thereupon will produce a negative output since the change-over switch circuit 25 is switched to the second input terminal a2 thereof. The negative output of the subtracting circuit 24 will be inverted in polarity at the inverter circuit 26 and delivered as an error signal S17 of a positive DC level.

Accordingly, if the error signal S17 is delivered, for example, as a correction signal to a phase servo circuit of a capstan servo system to correct the speed of travel of a tape such that the speed is increased when the output of the subtracting circuit 24 is positive whereas it is decreased when the output is negative, then the displacement between the video head and the reproduced track can be corrected accordingly, thereby realizing appropriate tracking servoing.

Figure 4:
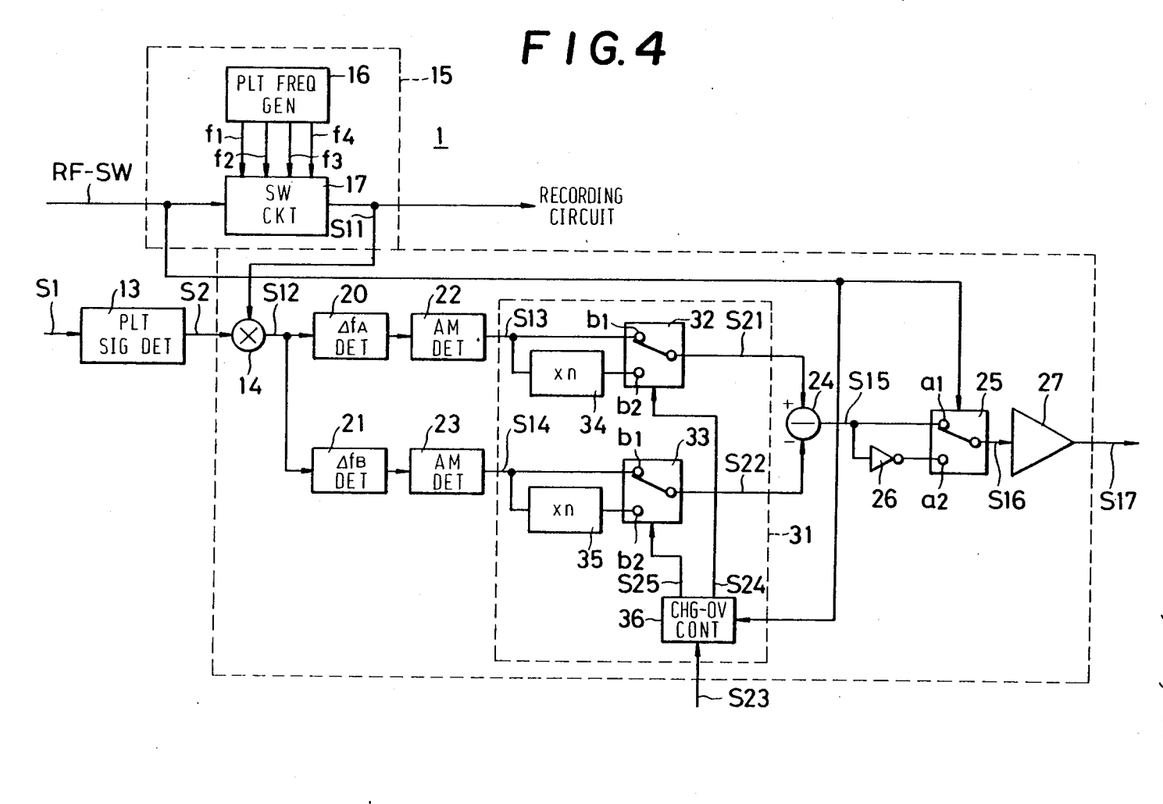
FIG. 4 is a block diagram of a tracking controlling apparatus showing a first embodiment of the invention.

FIG. 4 illustrates a tracking controlling apparatus according to the present invention. The apparatus has the following construction in addition to the basic construction as illustrated in FIGS. 1 and 2.

Figure 5:
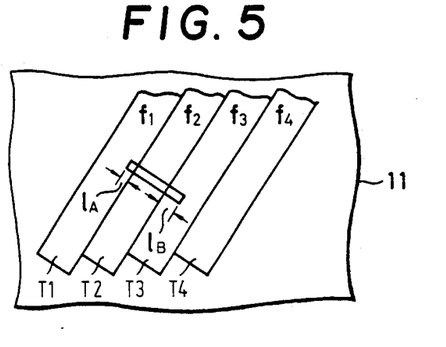
FIG. 5 is a diagrammatic representation of a track pattern on a tape, illustrating operations of the apparatus of FIG. 4.
Figure 6A:
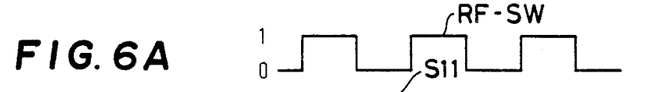
FIGS. 6A–6G are signal waveform charts for illustrating operations of the apparatus of FIG. 4.
Figures 6B, 6C:
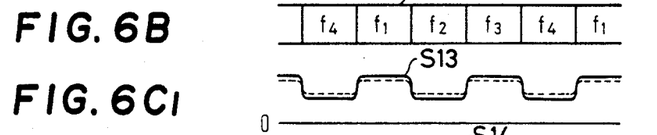
Figures 6C, 6D, 6D, 6E:
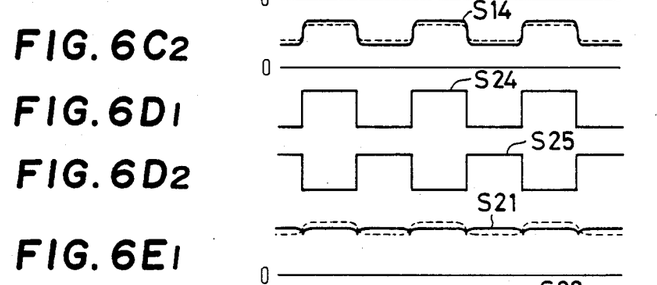
Figures 6E, 6F:
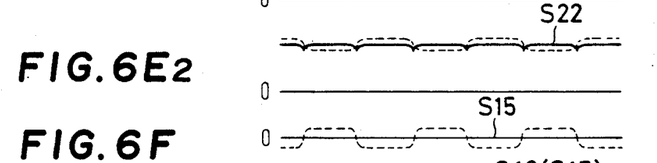
Figure 6G:
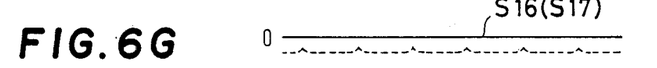

At first, it must be mentioned that the reproducing head 12 has a sufficient length to extend across a reproduced track T1, T2, T3 or T4 to adjacent left and right tracks T4 and T2, T1 and T3, T2 and T4, or t3 and T1, as shown in FIG. 5. As a result, a reproduction output S1 from the reproducing head 12 will include pilot signals obtained from the reproduced track and pilot signals obtained from the adjacent left and right tracks. But, of the reproduction output S1, the pilot signals obtained from the reproduced track will have a fixed magnitude irrespective of the magnitude of a displacement of the reproducing head because the reproducing head is opposed to the full width of the reproduced track; on the contrary, the magnitude of the pilot signals obtained from each of the adjacent left and right tracks depends upon the width of a portion of the head which is opposed to the adjacent track. Accordingly, if the reproducing head 12 is properly tracking a reproduced track, then the pilot signals obtained from the adjacent tracks will be equal to each other in magnitude; on the contrary, if the reproducing head 12 is displaced rightwardly or leftwardly, then the pilot signals obtained from that one of the adjacent tracks toward which the reproducing head is displaced will be greater in magnitude depending upon the magnitude of the displacement of the head 12 than the pilot signals obtained from the other adjacent track.

Secondly, a gain controlling circuit 31 is provided between the amplitude detector circuits 22 and 23 and the subtracting circuit 24. The gain controlling circuit 31 includes change-over switch circuits 32 and 33 each having a direct terminal b1 and an n-magnification input terminal b2. The first change-over switch circuit 32 directly receives at the direct terminal b1 thereof a first error detection signal S13 obtained from the first amplitude detector circuit 22 while it receives at the n-magnification terminal b2 the error detection signal S13 which is amplified in magnitude by multiplying the signal S13 by a coefficient n at a coefficient circuit 34. Similarly, the second change-over switch circuit 33 directly receives at the direct terminal b1 thereof a second error detection signal S14 obtained from the second amplitude detector circuit 23 while it receives at the n-magnification terminal b2 thereof the error detection signal S14 which is amplified in magnitude by multiplying the signal S14 by a coefficient n at another coefficient circuit 35. Thus, the first and second change-over switch circuits 32 and 33, when switched to the direct terminals, respectively, provide the subtracting circuit 24 with the first and second error detection signals S13 and S14 without modifying them as the adding input S21 and the subtracting input S22, respectively; on the contrary, when switched to the respective n-magnification terminals b2, the first and second change-over switch circuits 32 and 33 provide the subtracting circuit 24 with the adding input S21 and the subtracting input S22 which are obtained by multiplying the first and second error signals S13 and S14 by the coefficient n, respectively.

The first and second change-over switch circuits 32 and 33 are switched by change-over controlling outputs S24 and S25, respectively, which are produced at a change-over controlling circuit 36 in response to a setting signal S23.

In the construction as described hereinabove, when the reproducing head 12 is to be tracked properly, for example, to the second track T2, the first and second change-over switch circuits 32 and 33 are both switched to the respective direct terminals b1 thereof in response to the setting signal S23. In this position, the error detection signals S13 and S14 are directly fed to the subtracting circuit 24 so that a tracking error signal S17 for reducing an output S15 of the subtracting circuit 24 representative of a zero difference therebetween is fed to the servo circuit of the capstan system. Accordingly, the reproducing head 12 is then locked in position to reproduce the pilot signals f1 and f3 of the same magnitude from adjacent tracks T1 and T3, respectively, and hence the reproducing head 12 effects tracking at a proper lock position in which portions thereof having an equal length are opposed to the adjacent tracks T1 and T3 on the opposite sides of the reproduced track T2.

If the head 12 is to be locked to a position which is a little displaced to the right-hand side track T3 from the proper tracking lock condition, then the first change-over switch circuit 32 corresponding to an adjacent track which is on the side opposite to the direction in which the reproducing head 12 is to be displaced by resetting the setting signal S23, i.e., the left-hand side adjacent track T1, is switched to the n-magnification terminal b2 thereof by means of the change-over controlling circuit 36. In this case, since the first error detection signal S13 obtained in response to the difference frequency ΔfA becomes n times as large as the second error detection signal S14, the difference output S15 of the subtracting circuit 24 will increase in the positive direction. Accordingly, the tracking error signal S17 will be applied to control the servo circuit of the capstan system so as to offset this change to reduce the difference output S15 to zero, and hence the reproducing head 12 will be displaced in a direction to decrease the difference frequency ΔfA or in other words, in the rightward direction so that the length of a portion of the reproducing head 12 which is opposed to the left-hand side adjacent track T1 may be decreased. And when a balancing condition is reached, the ratio of the length $l_B$ of a portion of the reproducing head 12 which is opposed to the right-hand side adjacent track T3 relative to the length of another portion which is opposed to the left-hand side adjacent track T1 as shown in FIG. 5 is represented by an equation;

$$l_A : l_B = 1 : n \tag{3}$$

Signals of associated portions in this rightwardly displaced position of the reproducing head 12 are represented by full lines in FIG. 6. In particular, a reference pilot signal S11 (B of FIG. 6) of the tracking signal generator 15 is applied to the multiplier circuit 14 in response to a change of the logic level of the head change-over signal RF-SW (A of FIG. 6) so that the reproducing head 12 is locked to a position corresponding to the ratio 1:n (the case wherein n=2 is shown) depending upon the equation (3) above each time the first, second, third or fourth track T1, T2, T3 or T4 is reproduced. As a result, when the first track T1 is being reproduced (in case the reference pilot signal S11 is f1), the ratio of the error detection signal S13 (C1 of FIG. 6) obtained from the amplitude detector circuit 22 in response to the difference frequency ΔfA (=f1~f4) from the pilot signal f4 obtained from the left-hand side adjacent track T4 relative to the error detection signal S14 (C2 of FIG. 6) obtained from the amplitude detector circuit 23 in response to the difference frequency ΔfB (=f1~f2) from the pilot signal f2 obtained from the right-hand side adjacent track T2 will be 1:n (=1:2). And in this instance, the first change-over switch circuit 32 is supplied with a change-over controlling signal S24 (D1 of FIG. 6) of the logic level '0' for switching the circuit 32 to the direct terminal b1 while the second change-over switch circuit 33 is provided with a change-over controlling circuit S25 (D2 of FIG. 6) of the logic level '1' for switching the circuit 33 to the n-magnification terminal b2. As a result, the first error detection signal S13 is delivered as an adding input S21 directly to the subtracting circuit 24 (E1 of FIG. 6) while the second error detection signal S14 is multiplied by n (=2) at the coefficient circuit 35 and is delivered to the subtracting circuit 24 as a subtracting input S22 (E2 of FIG. 6) of the same DC level with the adding input S21. Accordingly, the difference output S15 (F of FIG. 6) of the subtracting circuit 24 becomes zero while the tracking error signal S17 (G of FIG. 6) also becomes zero in level. This indicates that tracking of the reproducing head 12 is locked at a position of the ratio 1:n.

Then, if reproduction of the second track T2 is started subsequently and the reference S11 is changed to be f2, the ratio of the error detection signal S13 (C1 of FIG. 6) of the difference frequency ΔfA produced in response to the pilot signal f1 obtained from the left-hand side adjacent track T1 by the reproducing head 12 as described hereinabove in regard to FIG. 5 relative to the error detection signal S14 (C2 of FIG. 6) of the difference frequency ΔfB produced in response to the pilot signal f3 obtained from the right-hand side adjacent track T3 is reversed to be 1:n while the logic levels of the change-over controlling signals S24 and S25 (D1 and D2 of FIG. 6) delivered to the first and second change-over switch circuits 32 and 33, respectively, are also reversed so that the first error detection signal S13 is multiplied by n (=2) at the coefficient circuit 34 and hence the level of the adding output S21 of the first change-over switch circuit 32 becomes the same as that of the subtracting output S22 obtained from the second error signal S14 (E1 and E2 of FIG. 6). Accordingly, the difference output S15 (F of FIG. 6) and the tracking error signal S16 are reduced to 0 level to thereafter maintain the balancing condition in a similar manner as of the preceding case for reproducing the first track T1.

Thereafter, the tracking balancing condition is attained in a similar manner for each of the odd- and even-numbered tracks of the tape.

If the reproducing head 12 is displaced leftwardly from the rightwardly displaced position by some reason, then some change appears to the adding input S22 and subtracting input S22 to the subtracting circuit 24 as shown by broken lines in FIG. 6 (E1 and E2 of FIG. 6) whereupon the difference output S15 of the subtracting circuit 24 varies correspondingly (F of FIG. 6) so that the tracking error signal S17 is lowered to a negative level to thus provide the servo circuit of the capstan system with an instruction to displace the reproducing head 12 back rightwardly. Thus, although the error detections signals S13 and S14 vary temporarily, they will soon return to their balancing conditions as shown by full lines in FIG. 6.

Subsequently, when the reproducing head 12 is to be displaced leftwardly from the position in which it properly tracks the reproduced track T2, the setting signal S23 is reset to cause the change-over controlling circuit 36 to operate such that the second change-over switch circuit 33 corresponding to an adjacent track on the side opposite to the direction in which the reproducing head 12 is to be displaced, that is, the right-hand side adjacent track T3, is switched to the n-magnification terminal b2 thereof (the first change-over switch circuit 32 is switched to the direct terminal b1). By this operation, the reproducing head 12 can be displaced leftwardly in a same manner as in the preceding case in which the reproducing head 12 is to be displaced rightwardly, and when in a balancing condition, the ratio of the width $l_A$ of a portion of the reproducing head 12 which is opposed to the left-hand side adjacent track T1 relative to the length $l_B$ of another portion of the reproducing head 12 which is opposed to the right-hand side adjacent track T3 is represented by the following equation:

$$l_A : l_b = n : 1 \qquad (4)$$

According to the construction of FIG. 1 as described hereinabove, the reproducing head 12 can be easily displaced in a selected direction leftwardly or rightwardly by a distance corresponding to a ratio between coefficients which are set by the coefficient circuits 34 and 35 and accordingly by a distance corresponding to the magnitude of a change of gains of the signals S13 and S14.

Figure 7:
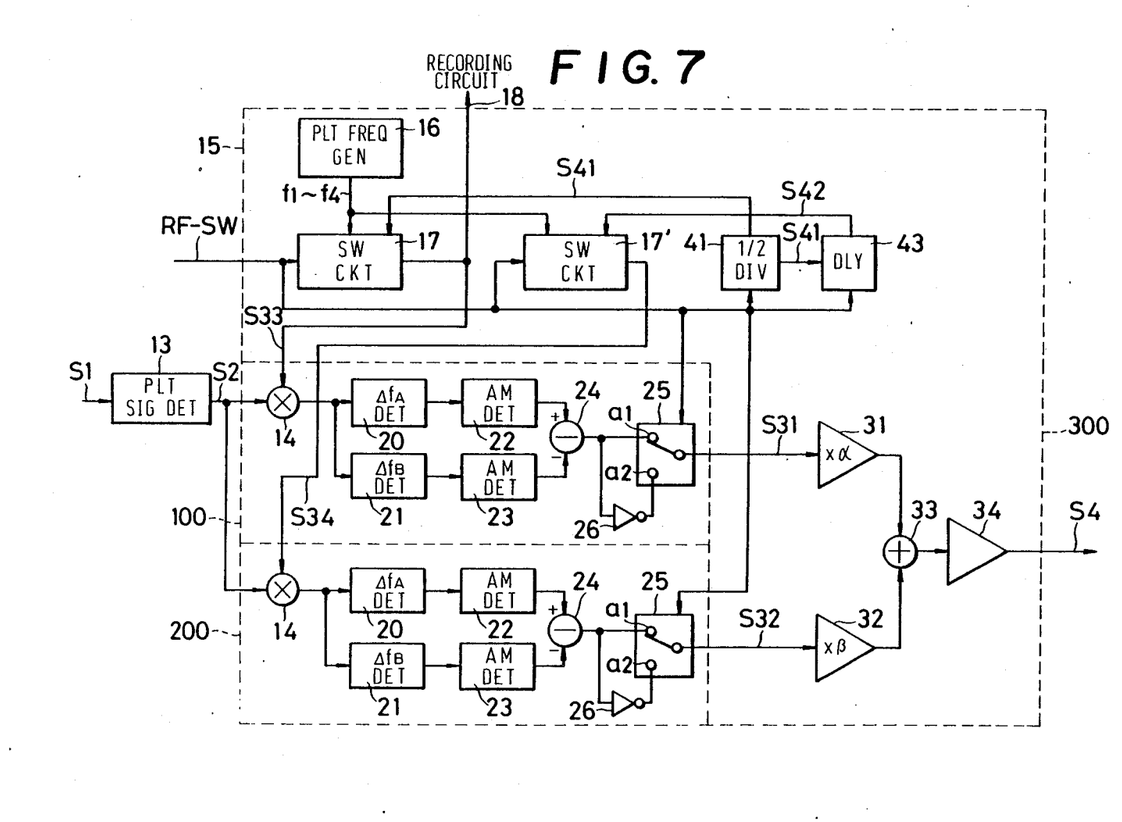
FIG. 7 is a block diagram showing a tracking controlling apparatus according to a second embodiment of the invention.

FIG. 7 shows another embodiment of tracking controlling apparatus according to the invention, in which same numerals are attached to same elements as shown in FIG. 4 and the detailed explanations are omitted for the sake of simplicity. In FIG. 7, the reproduced pilot signal S2 detected from the pilot signal detector 13 are supplied to first and second error signal forming circuits, each of which is constructed with the same circuit as that in FIG. 1. Error signals S31 and S32 which are respectively generated from the first and second error signal forming circuits 100 and 200 are fed to phase-error operating circuit 300 to obtain tracking error signal S4 therefrom, as hereinafter explained in detail. It is noted that the magnitude and the polarity of the error signals S31 and S32 are varied in response to the shift amount of the head 12 from the reproducing track to be traced. Consequently, the tracking position of the head 12 can be adjusted by mixing the error signals S31 and S32 with predetermined ratio in the phase-error operating circuit 300.

In particular, voltages E1 and E2 of error signals S31 and S32 obtained from the first and second error signal forming circuits 100 and 200 are multiplied respectively by coefficients $\alpha$ and $\beta$ at the coefficient circuits 31 and 32 of the phase-error operating circuit 300 and are then added to each other to obtain a resultant voltage E3

$$E3 = \alpha E1 + \beta E2 \qquad (3)$$

which is fed as a tracking error signal S4 by way of an amplifier circuit 34. Accordingly, if the coefficients $\alpha$ and $\beta$ in the equation (3) are arbitrarily selected, then the value E3 of the tracking error signal S4 will depend upon the values E1 and E2 of the error signals S31 an S32.

Figures 8A, 8B, 8B, 8B, 8B, 8B, 8B, 8B, 8B:
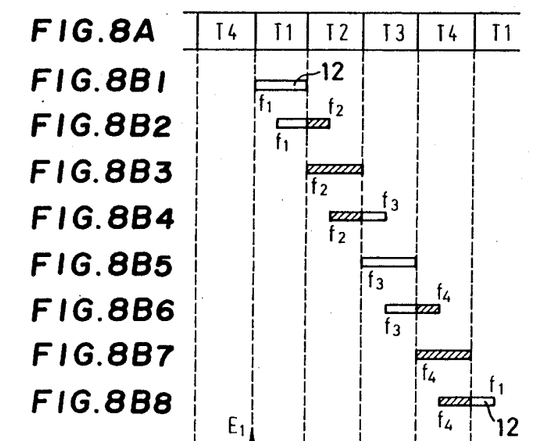
Figure 8C:
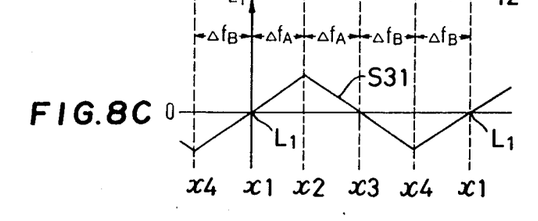

When the first, second, third and fourth tracks T1, T2, T3 and T4 are to be reproduced, the first error signal forming circuit 100 delivers pilot signals of frequencies f1, f2, f3 and f4 respectively assigned thereto as reference pilot signals S33 to the multiplier circuit 14. By this construction, when the head 12 properly tracks the first one T1 of the tracks T1 to T4 (A of FIG. 8) as shown in B1 of FIG. 8, only the pilot signal f1 recorded on the first track T1 is reproduced in the head 12 and hence neither the difference frequency $\Delta fA$ nor the difference frequency $\Delta fB$ appears at the output of the multiplier circuit 14. Accordingly, the value E1 of the error signal S31 becomes E1=0 as shown at the position x1 of C of FIG. 8. But, if the head 12 is shifted to a position in which it extends over part of the first and second tracks T1 and T2, or another position in which it is entirely opposed to the second track T2, or a further position in which it extends over part of the second and third tracks T2 and T3, then the pilot signal f2 recorded on the second track T2 will be reproduced by the head 12 and hence a component of the difference frequency $\Delta fA$ ($= f1 \sim f2$) will be included in the output of the multiplier circuit 14. Since the magnitude of the component of the difference frequency $\Delta fA$ depends upon the width of a portion of the head 12 which is opposed to the second track T2, the voltage E1 of the error signal gradually increases in the positive direction as the head 12 is displaced rightwardly from the position in which it is entirely opposed to the first track T1, as shown by C of FIG. 8; thus, the voltage E1 presents its maximum at the position x2 when the head 12 is entirely opposed to the second track T2, and it decreases gradually as the head 12 is displaced further from the position x2.

If the head 12 is displaced to a position x3 in which it is entirely opposed to the third track T3 as shown by B5 of FIG. 8, the head 12 will reproduce only the pilot signal f3 recorded on the third track T3 and hence neither of the difference frequencies $\Delta fA$ ($= f1 \sim f2$) will be obtained from the multiplier circuit 14. Accordingly, the value E1 of the error signal S31 becomes E1=0 as shown by C in FIG. 8.

If the head 12 is further displaced rightwardly and is opposed to the fourth track T4 as shown by B6, B7 and B8 of FIG. 8, the head 12 will reproduce the pilot signal recorded on the fourth track T4 so that a component of the difference frequency $\Delta fB$ ($= f1 \sim f4$) will be included in the output of the multiplier circuit 14. Again, since the magnitude of the component depends upon the width of a portion of the head 12 which is opposed to the fourth track T4, the value E1 of the error signal S31 increases gradually in the negative direction as the head 12 is displaced rightwardly from a position in which the entire head 12 is opposed to the third track T3 as shown by the position x3 of C of FIG. 8; when the head 12 is at the position x4 and is entirely opposed to the fourth track T4, the value E1 becomes maximum, and as the head 12 is further displaced from the position x4 toward the next position x1, the value E1 increased gradually.

Meanwhile, when the error signal S31 is of a positive value on a curve of the error signal S31 of C of FIG. 8, the capstan servo circuit will operate to increase the running speed of the tape so as to return the head 12 to a lock point L1 of the position x1 in which it is entirely opposed to the first track T1. On the contrary, when the error signal S31 is of a negative value, the capstan servo circuit will operate to decrease the running speed of the tape so as to return the head 12 to the lock point L1 of the position x1 in which it is entirely opposed to the first track T1 in order to attain proper tracking.

While a description has been given of the case in which the reproducing head 1 reproduces the first track T1 just above, it is understood that an error signal S31 will be delivered from the first error signal forming circuit 100 to attain proper tracking in a similar manner also when the second, third or fourth track T2, T3 or T4 is reproduced.

Figures 10A, 10B:
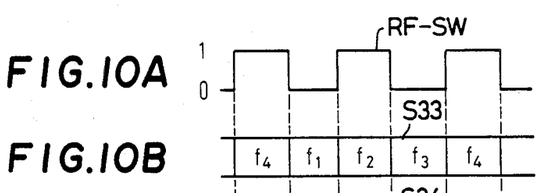
FIGS. 10A–10E are signal waveform charts for illustrating assignment of frequencies of a reference pilot signal.
Figure 10C:
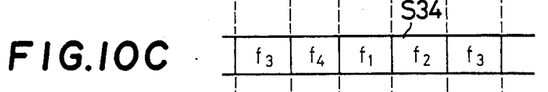
Figure 10D:
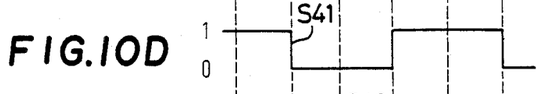

On the other hand, the second error signal forming circuit 200 produces an error signal S32 the lock point L of which is displaced rightwardly by a distance corresponding, for example, to one track distance from that by the first error signal forming circuit 100. Accordingly, the multiplier circuit 14 of the second error signal forming circuit 200 will be supplied with a reference pilot signal S34 of the same frequency as that of the pilot signals recorded on a track which is displaced by one track distance when compared with the multiplier circuit 14 of the first error signal forming circuit 100. In particular, when the frequency of the reference pilot signal S33 to the first error signal forming circuit 100 is f1, f2, f3 or f4, the frequency of the reference pilot signal S34 to the second error signal forming circuit 200 becomes f4, f1, f2 or f3, respectively. To this end, the tracking signal generator 15 is designed to divide the head change-over pulses RF-SW (A of FIG. 10) by means of a ½ frequency divider 41 thereof to produce a divided output S41 (D of FIG. 10) which is provided to the first switch circuit 17 as a reset signal. In the present embodiment, the first switch circuit 17 resets the counter circuit when the divided output S41 falls from the logic '1' level to the logic '0' level whereupon repetition of sequential gating of the pilot frequency outputs f1, f2, f3 and f4 of the pilot frequency generating circuit 16 is started again as shown by B of FIG. 10.

Figure 10E:
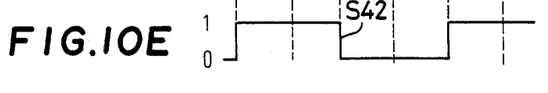

In the meantime, the divided output S41 of the ½ dividing circuit 41 is delayed by one track distance at a delay circuit 43 from which a delayed output S42 (E of FIG. 10) is delivered to the second switch circuit 17' as a reset signal. In the present embodiment, the second switch circuit 17' is designed, similarly to the first switch circuit 17, to reset the counter circuit by a falling edge of the delayed output S41 so that repetition of sequential gating of the pilot frequency outputs f1, f2, f3 and f4 is started again at the instant of the falling edge of the delayed output S41.

Thus, at the time when the reference pilot signal S33 (B of FIG. 10) of the first switch circuit 17 presents the pilot frequency f1, f2, f3 or f4 of the first, second, third or fourth track T1, T2, T3 or T4, the reference pilot signal S34 (C of FIG. 10) to be delivered from the second switch circuit 17' will pesent the pilot frequency f4, f1, f2 or f3 of the left-hand side adjacent track T4, T1, T2 or T3, respectively.

Figures 9A, 9B, 9B, 9B, 9B, 9B, 9B, 9B, 9B:
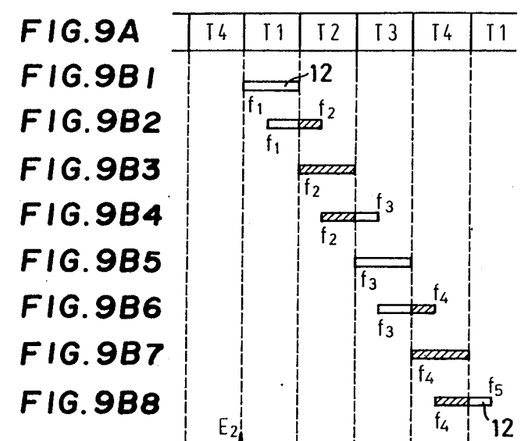
Figure 9C:
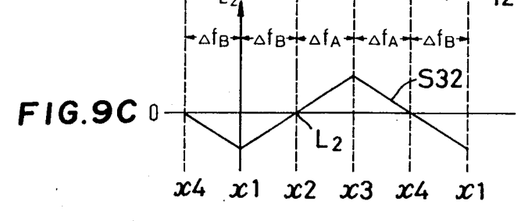

By this construction, when the reproducing head 12 is in the position x1 to properly track the first track T1 as shown by B1 of FIG. 9, the head 12 will reproduce the pilot signals f1 and consequently the the difference frequency $\Delta fB$ ($=f4\sim f1$) will appear at the output of the multiplier circuit 14 so that the value E2 of the error signal S32 (C of FIG. 9) will be maximum in the negative. If the head 12 is displaced from this position to a position in which it is partially opposed to the second track T2 (B2 of FIG. 9), the value E2 of the error signal S32 will gradually increase as the width of a portion of the head 12 which is opposed to the track T1 decreases, and finally, when the head 12 comes to the position x2 and is entirely opposed to the second track T2, the value E2 will become E2=0 (B3 of FIG. 9). If the head 12 is further displaced rightwardly from this position successively to a position in which it is partially opposed to the third track T3 (B4 of FIG. 9), to another position in which it is entirely opposed to the third track T3 (B5 of FIG. 9) and to a further position in which it is partially opposed to the fourth track T4 (B6 of FIG. 9), the value E2 of the error signal S32 will increase in the positive direction in accordance with the length of a portion of the head 12 which is opposed to the third track T3 and will present its maximum at the position x3 whereafter it will decrease (C of FIG. 9). If the head 12 comes to the position x4 and is entirely opposed to the fourth track T4 (B7 of FIG. 9), then the value E2 of the error signal S32 will become E2=0 (C of FIG. 9). If the head 12 is displaced from this position to a position in which it is partially opposed to the first track T1 (B8 of FIG. 9), then the error signal S32 will decrease again in the negative direction in accordance with the length of a portion of the head 12 which is opposed to the first track T1 (C of FIG. 9).

While description has been given just above of variation of the error signal E2 at various positions of the head 12 for reproducing the first track T1, it is to be understood that, also when the second, third or fourth track T2, T3 or T4 is to be reproduced, such an error signal S32 will be delivered from the second error signal forming circuit 200 for locking the reproducing head 12 to a position which is displaced by one track distance in a similar manner.

Figure 11:
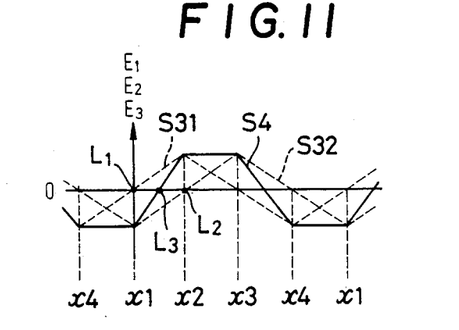
FIG. 11 is a signal waveform chart for illustrating operations of a phase-error operating circuit of FIG. 7.

Thus, the error signals S31 and S32 (C of FIG. 8 and C of FIG. 9) formed at the first and second error signal forming circuits 100 and 200 are multiplied by coefficients $\alpha$ and $\beta$, respectively, at the phase-error operating circuit 5 and are added to each other to obtain a resultant tracking error signal S4. Accordingly, if $\alpha$ and $\beta$ are selected $\alpha=\frac{1}{2}$ and $\beta=\frac{1}{2}$, the tracking error signal S4 will vary along a curve which crosses the 0 point by a positive slope when the track displacement is within a range from 0 to 1 track distance, as shown in FIG. 11, and this cross point with zero makes a rightwardly shifted new tracking lock point L3. Thus, if required, the position of this tracking lock point L3 can be voluntarily changed within a limited range from 0 to 1 track distance by adjusting values of the coefficients $\alpha$ and $\beta$, or in other words, by adjusting the ratio of magnitude between the first and second error signals S31 and S32.

Figure 12:
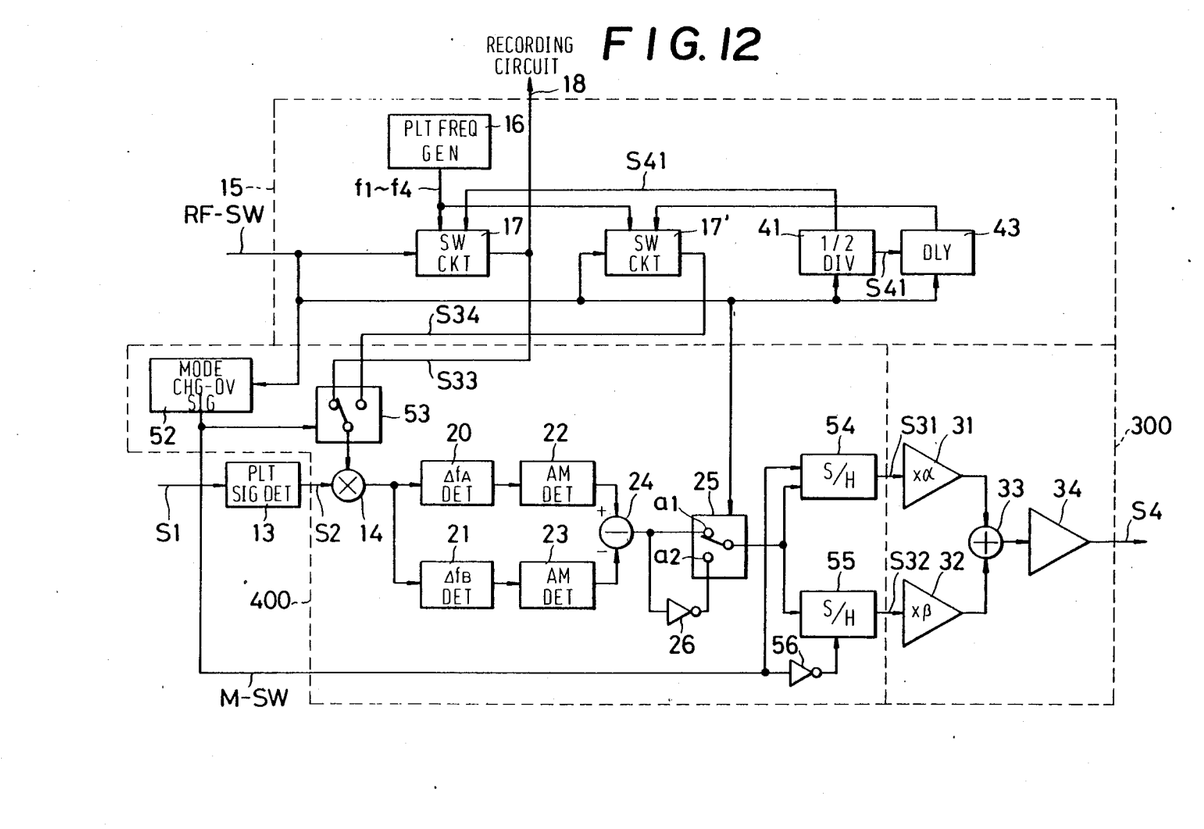
FIG. 12 is a block diagram illustrating a third embodiment of the invention.
Figure 13A:
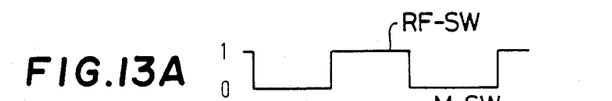
FIGS. 13A and 13B are signal waveform charts showing a mode change-over signal of the apparatus FIG. 12.
Figure 13B:
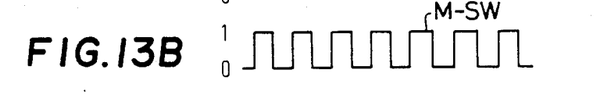
Figure 14A:
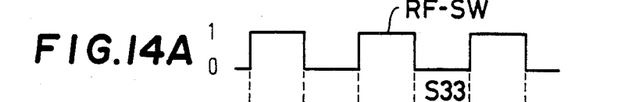
FIGS. 14A–E and 15 are signal waveform charts showing opertions of a modified form of the apparatus of the invention.
Figure 14B:
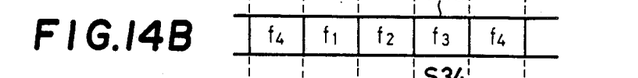
Figure 14C:
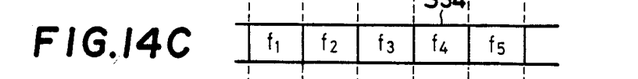
Figure 14D:
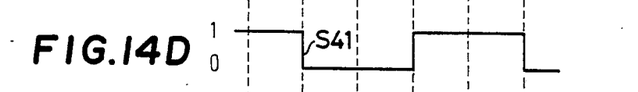
Figure 14E:
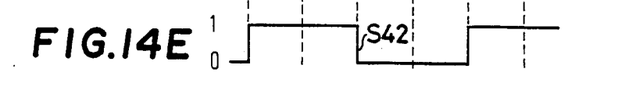

FIG. 12 illustrates a further embodiment of the present invention, which includes, instead of the first and second error signal forming circuits 100 and 200 of FIG. 7, a common error signal forming circuit 400 for producing first and second error signals S31 and S32. The apparatus further includes a mode change-over signal producing circuit 52 which receives head change-over pulses RF-SW (A of FIG. 13) to produce a mode change-over pulse signal M-SW which has positive and negative pulses of a width equal to, for example, 50H as shown by B of FIG. 13. Meanwhile, outputs of the first and second switch circuits 17 and 17' of the tracking signal generator 15 are alternatively delivered to the multiplier circuit 14 by means of a reference pilot signal change-over switch circuit 53 which switchably operates in response to a mode change-over pulse signal M-SW. The mode change-over pulse signal M-SW is fed as an enable signal to first and second sample holding circuits 54 and 55 directly and by way of an inverter circuit 56, respectively. The first and second sample holding circuits 54 and 55 receive an output of a change-over switch circuit 25 of the error signal forming circuit 400 as a sampling input. Outputs of the sample holding circuits 54 and 55 are fed to first and second coefficient circuits 31 and 32 of the phase-error operating circuit 300 as first and second error signals S31 and S32.

In the construction of FIG. 12, the reference pilot signal change-over switch circuit 53 is switched by a rising edge of 50H of the mode change-over signal M-SW produced at the mode change-over signal producing circuit 52 so that the first reference pilot signal S33 delivered from the first switch circuit 17 is fed to the multiplier circuit 14. As a result, the first error signal S31 is fed to the first sample holding circuit 54 by way of the switch circuit 25 and is sample held by the circuit 54 in a similar manner as described hereinabove in regard to A to C of FIG. 8. On the contrary, the reference pilot signal change-over switch circuit 53 is reversely switched by a falling edge of 50H of the mode change-over signal M-SW so that the second reference pilot signal S34 delivered from the second switch circuit 17' is fed to the multiplier circuit 14. As a result, the second error signal S31 is fed to the second sample holding ciruit 55 by way of the switch circuit 25 and is sample held by the circuit 55 in a similar manner as described hereinabove in regard to A to C of FIG. 9. Thus, sample held values are renewed after each lapse of time 50H alternately at the sample holding circuits 54 and 55, and hence, in practice, the reproducing head 12 can be tracked to a predetermined tracking lock position in a similar manner to that as described hereinabove in regard to FIG. 1.

Accordingly, by the construction of FIG. 12, the structure of the error signal forming circuit 51 can be reduced to substantially a half of that of FIG. 7.

It is to be noted that, while the coefficients $\alpha$ and $\beta$ of the coefficient circuits 31 and 32 of the phase-error operating circuit 300 are constant in the embodiment just described, they may be variable so as to facilitate setting of a tracking lock point.

Figure 15:
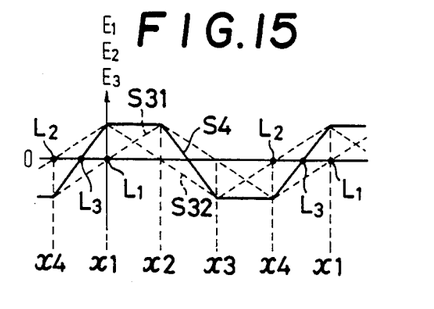

Further, while in the embodiment a tracking lock point is set to a rightwardly displaced position, it may be set to a leftwardly displaced position. In order to effect such setting, the frequency of the second reference pilot signal S34 may be specified such that, when the frequency of the first reference pilot signal S33 varies in sequence f1, f2, f3 and f4 (B of FIG. 14), it varies in sequence f2, f3, f4 and f1 as displaced rightwardly by one track distance from the frequency of the first reference pilot signal S33, as shown by A to E of FIG. 14 which correspond to A to E of FIG. 10, respectively. As a result, the second error signal S32 will vary along a similar curve which is displaced leftwardly by one track distance from that of the first error signal S31 as seen in FIG. 15 which corresponds to FIG. 11. Thus, the tracking lock point L3 of the tracking error signal S4 can be set to a position which is displaced within a range of 0 to 1 track distance, as shown by FIG. 15.

It is also to be noted that similar effects can be attained if, instead of specifying the sequence of frequencies of the second reference pilot signal S34 as shown by A to E of FIG. 14, the sequence is specified as shown by A to E of FIG. 10 so as to obtain at an output terminal of the error signal forming circuit a second error signal S32 as shown in FIG. 11 which is inverted by the inverter circuit and is fed to the phase-error operating circuit 300. This is because, as apparent also from the fact that the same waveform with the error signal S32 as shown in FIG. 15 can be obtained if the error signal S32 as shown in FIG. 11 is inverted, inversion of the polarity of the error signal S31 or S32 means that it provides the same effect that the tracking lock point is shifted or displaced rightwardly or leftwardly by two track distances.

Further, while, in FIG. 7, frequencies are assigned in a similar manner to that as shown in FIG. 10 in which they are displaced by one track distance leftwardly and at the same time the switch circuit 25 of the second circuit 200 is designed to operate in synchronism with the switch circuit 25 of the first circuit 100 in order to obtain the second error signal S32 of FIG. 11, it is alternative that frequencies of the second reference pilot signal S34 may otherwise be assigned in a similar manner to that as shown in FIG. 14 in which they are displaced by one track distance rightwardly and at the same time the switch cricuit 25 of the second circuit 20 may be designed to effect switching operations in a reverse relationship to those of the switch circuit 25 of the first circuit 100. For the reverse switching operations, the head change-over pulses RF-SW may be fed as change-over operation signals to the switch circuit 25 of the second circuit 200 by way of an inverter circuit. This is because, by such modification, output of the subtracting circuit 24 of the second error signal forming circuit 200 is inverted by the inverter circuit 26 to obtain a signal having the opposite polarity relative to the output of the subtracting circuit 24 of the first error signal forming circuit 100; this means that it will provide a similar effect to that when the phase of the second error signal S32 is shifted by two track distances as decribed hereinabove, and accordingly the displacement of the track which has been accomplished by the assignment of frequencies of the second reference pilot signal S34 will be compensated thereby.

Figure 16:
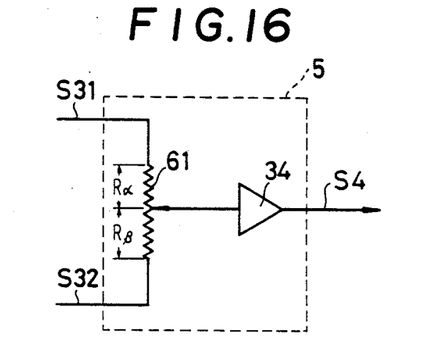
FIG. 16 is a wiring diagram of part of another modified form of the apparatus of the invention.

Besides, while the phase error operating circuit 300 in the embodiment as described hereinabove is constituted from the first and second coefficient circuits 31 and 32 and the adding circuit 33, it may otherwise be provided with a variable resistor 61 which receives at opposite ends thereof the first and second error signals S31 and S32 so as to obtain the tracking error signal S4 from a movable member of the variable resistor 61. In this case, the ratio between the coefficients $\alpha$ and $\beta$ in the equation (3) hereinabove will depend upon the ratio between divided resistances $R_{60}$ and $R_{62}$ of the variable resistor 61. By this constitution, the construction of the phase-error operating circuit 5 can be simplified further and setting of the tracking lock point can be made further easier by the fact that the ratio between the coefficients $\alpha$ and $\beta$ can be varied easily.

Still further, while description has been given as the capstan servo circuit is controlled by tracking error signals to displace the track, the reproducing head may alternatively be displaced by controlling a drum servo circuit. Also, the record medium is not limited to a tape, but it may be a disk or the like.

In addition, while, in order to obtain error signals at the error signal forming circuits in the embodiments as described hereinabove, the difference frequencies $\Delta fA$ and $\Delta fB$ which are obtained by multiplying the detected pilot signal S2 by the reference pilot signal are converted into direct current to form corresponding error signals, alternatively individual levels of the pilot signals F1 to f4 included in the detected pilot signal S2 may be separately detected using, for example, band pass filters and such detection outputs may be compared between those for the reproducing track and an adjacent track to form corresponding error signals.

What is claimed is:

1. An apparatus for controlling the tracking position of a head which records and reproduces tracks sequentially on a record medium, each said track containing a pilot signal recorded therein having a different frequency from the frequencies of the pilot signals recorded in adjacent tracks, said frequencies changing in cylic sequence from track to track, comprising:

control signal generating means for generating first and second control signals which are respectively indicative of opposite displacements of said head from a track to be traced;

tracking error signal generating means for generating a tracking error signal from said first and second control signals, said tracking position being controlled in response to said tracking error signal; and     control means for controlling the magnitude of said control signals according to a desired tracking position of said head.

2. An apparatus according to claim 1, in which said control means includes gain control circuit means for controlling the magnitudes of said first and second control signals.

3. An apparatus according to claim 2, in which said gain control circuit means includes multiplier means for multiplying said first and second control signals to form multiplied first and second control signals.

4. An apparatus according to claim 1, further comprising switch means for selectively supplying said first and second control signals from said control signal generating means and from said control means to said tracking error signal generating means.

5. An apparatus for controlling the tracking position of a head which records and reproduces tracks sequentially on a record medium, each said track containing a pilot signal recorded therein having a different frequency from the frequencies of the pilot signals recorded in adjacent tracks, said frequencies changing in cyclic sequence from track to track, comprising:

control signal generating means for generating first and second control signals which are respectively indicative of opposite displacements of said head from a track to be traced;

tracking error signal generating means for generating a tracking error signal from said first and second control signals, said tracking position being controlled in response to said tracking error signal; and     control means for controlling the magnitude of said control signals according to a desired tracking position of said head;

said control signal generating means including circuit means for multiplying said pilot signal reproduced from the track with a first reference signal having a frequency which changes from track to track in said cyclic sequence to enable generation of said first control signal and for multiplying said pilot signal reproduced from the track with a second reference signal having a frequency which changes from track to track in said cyclic sequence and which differs by one track from said cyclic sequence of said first reference signal to enable generation of said second control signal, said tracking error signal being formed by mixing said first and second control signals.

6. An apparatus according to claim 5, in which said control means includes gain control means for controlling the magnitudes of said first and second control signals.

7. An apparatus according to claim 6, in which said gain control means comprises a variable resistor having first and second fixed terminals and a movable terminal, said first and second tracking error signals being supplied to said first and second fixed terminals, respectively, and said tracking error signal being derived from said movable terminal.

8. An apparatus for controlling the tracking position of a head which records and reproduces tracks sequentially on a record medium, each said track containing a pilot signal recorded therein having a different frequency from the frequencies of the pilot signals recorded in adjacent tracks, said frequencies changing in cyclic sequence from track to track, comprising:

control signal generating means for generating first and second control signals which are respectively indicative of opposite displacements of said head from a track to be traced;

tracking error signal generating means for generating a tracking error signal from said first and second control signals, said tracking position being controlled in response to said tracking error signal; and     control means for controlling the magnitude of said control signals according to a desired tracking position of said head;

said control signal generating means including reference signal generating means for generating a first reference signal having a frequency alternating from track to track in said cyclic sequence, and a second reference signal having a frequency alternating from track to track in said cyclic sequence and offset in phase by one track from said cyclic sequence of the frequency of said first reference signal; and multiplier means for multiplying said first reference signal with said pilot signal to enable generation of said first control signal and for multiplying said second reference signal with said pilot signal to enable generation of said second control signal; and     said tracking error signal generating means including means for adding said first and second control signals.

9. An apparatus according to claim 8; wherein said control means includes gain control means for controlling the gain of said first and second control signals.

10. An apparatus according to claim 9; wherein said control means includes:

first coefficient multiplier means for multiplying said first control signal by a predetermined amount to generate a multiplied first control signal;

second coefficient multiplier means for multiplying said second control signal by a predetermined amount to generate a multiplied second control signal; and     means for supplying said multiplied first and second control signals to said means for adding.

11. An apparatus according to claim 10; wherein said control means includes:

first switch means for selectively supplying one of said multiplied first control signal and said first control signal to said means for adding; and     second switch means for selectively supplying one of said multiplied second contrll signal and said second control signal to said means for adding.

12. An apparatus according to claim 10; wherein said control means includes first and second control signals and for supplying the sampled and held first and second control signals to said first and second coefficienct multiplier means.

* * * * *